United States Patent [19]
Strauch et al.

[11] Patent Number: 5,321,434
[45] Date of Patent: Jun. 14, 1994

[54] DIGITAL COLOR PRINTER WITH IMPROVED LATERAL REGISTRATION

[75] Inventors: Andrew M. Strauch; Fred F. Hubble, III, both of Rochester; Kenneth R. Ossman, Macedon, all of N.Y.

[73] Assignee: Xerox Corporation, Stamford, Conn.

[21] Appl. No.: 991,228

[22] Filed: Dec. 16, 1992

[51] Int. Cl.$^5$ .................. B41J 2/435; G01D 15/16
[52] U.S. Cl. ................... 346/108; 346/160; 346/1.1
[58] Field of Search ............ 346/1.1, 108, 107 R, 346/76 L, 160; 358/481, 296, 300, 302

[56] References Cited

U.S. PATENT DOCUMENTS

| | | | |
|---|---|---|---|
| 4,310,757 | 1/1982 | Check, Jr. et al. | 358/481 |
| 4,485,982 | 12/1984 | St. John et al. | 242/57.1 |
| 4,611,190 | 9/1986 | Kohyama et al. | 355/4 |
| 4,791,452 | 12/1988 | Kasai et al. | 355/14 D |
| 4,833,503 | 5/1989 | Snelling | 355/259 |
| 4,912,491 | 3/1990 | Hoshino et al. | 346/160 |
| 4,961,089 | 10/1990 | Jamzadeh | 355/207 |

*Primary Examiner*—Mark J. Reinhart

[57] ABSTRACT

A method and apparatus is provided for lateral registration of image exposures on photoreceptive belts subject to lateral deviation from linear travel. In one embodiment, a plurality of Raster Output Scanner (ROS) imagers in a digital color printer are positioned so as to form successive images on the surface of the belt. A plurality of split cell photodetectors are positioned beneath the belt, one each associated with each of the ROS imagers. An aperture is formed in the belt in a non-image area, but in alignment with the detectors. Scan lines from each ROS unit are periodically visible through the aperture and illuminate the photodetector. The outputs from each of the photodetector photosites are compared and lateral belt movement errors thereby identified. Appropriate correction signals are generated to maintain the correct lateral registration.

5 Claims, 5 Drawing Sheets

FIG. 1 *PRIOR ART*

DIGITAL COLOR PRINTER WITH IMPROVED LATERAL REGISTRATION

BACKGROUND OF THE INVENTION AND MATERIAL DISCLOSURE STATEMENT

The present invention relates to the registration of color images in a digital color printer and, more particularly, to an improved method and apparatus for detecting lateral registration errors between color separations in Raster Output Scanner (ROS) systems.

In recent years, digital color printers have been increasingly utilized to produce output copies from input video data representing original image information. The printer uses a plurality of imagers, either ROS or LED print bars, to expose the charged portions of a photoconductive member to record an electrostatic latent image thereon. Generally, a ROS incorporates a laser for generating a collimated beam of monochromatic radiation. The laser beam is modulated in conformance with the image information. The modulated beam is incident on a scanning element, typically a rotating polygon having mirrored facets. The light beam is reflected from each facet and thereafter focused to a spot on the photosensitive member. The rotation of the polygon causes the spot to scan linearly across the photoconductive member in a fast scan (i.e., line scan) direction. Meanwhile, the photoconductive member is advanced relatively more slowly in a slow scan direction which is orthogonal to the fast scan direction. In this way, the beam scans the recording medium with a plurality of scan lines in a raster scanning pattern. The light beam is intensity-modulated in accordance with an input image serial data stream, at a rate such that individual picture elements ("pixels") of the image represented by the data stream are exposed on the photoconductive member to form a latent image, which is then transferred to an appropriate image receiving medium such as paper.

Color digital printers may operate in either a single pass or multiple pass mode. In a single pass, process color system, three ROS imagers are positioned adjacent to a moving photoreceptor surface and are selectively energized to create successive image exposures, one for each of the three process colors, cyan, magenta and yellow. A fourth black imager is usually added. A color digital printer may also operate in a highlight color mode wherein one or two colors and black are exposed.

In a multiple pass system, each image area on the photoreceptor surface must make at least three revolutions (passes) relative to the transverse scan lines formed by the modulated beam generated by the imagers. With either system, each image is typically formed within a tight tolerance of ±0.05 mm. Each color image must be registered in both the photoreceptor process direction and in the direction perpendicular to the process direction (referred to as fast scan, lateral or transverse registration). The description "lateral" will be used hereafter.

In the past, the problems associated with lateral registration of pixels in multiple exposures of images on photoreceptive belts have been addressed either by attempts to guide the belt in a manner to avoid or at least reduce lateral belt shifting, or by corrective steering of the belt in response to sensed lateral deviation from true linear travel. Belt steering techniques previously employed have most commonly relied on belt edge sensors to detect lateral shifting of the belt and to control a mechanical steering mechanism for returning it to the correct line of travel. Such belt steering systems are subject to inaccuracy resulting from belt width tolerances and edge waviness and also require a mechanical steering mechanism which requires a substantial measure of belt travel and time before the electrically sensed belt shifting can be accomplished. Registration in the transverse direction of ROS systems is known in the prior art and registration techniques are disclosed in copending applications, U.S. Ser. No. 07/635,835 filed on Jan. 3, 1991, U.S. Ser. No. 07/807,927 filed on Dec. 16, 1991, and U.S. Ser. No. 07/821,526, filed on Jan. 16,1992, all assigned to the same assignee as the present invention.

The following patents and applications may be relevant to various aspects of this invention.

U.S. Pat. No. 4,912,491 to Hoshino discloses an apparatus for forming superimposed images as well as forming registration marks corresponding to the position of the images associated therewith. The registration marks are formed apart from the imaging portion of the medium and are formed in a transparent area so as to be illuminable from below. Thus, detectors detect the position of the registration marks as the marks pass between the illuminated areas. The detection/sensing of marked positions is used in determining proper registration positioning whereby the image forming devices may be adjusted to achieve such registration.

U.S. Pat. No. Re. 32,967 to St. John et al., a reissue of U.S. Pat. No. 4,485,982, issued Dec. 4, 1984, discloses a web tracking system for a continuous web which passes along a predetermined path through one or more processing stations. The tracking system has aligned tracking indicia on one or both sides of the web and means are provided for sensing these indicia which are indicative of dimensional changes in width and length of the web at a particular point and further there is also provided an edge sensor to determine movement of the web itself.

U.S. Pat. No. 4,961,089 to Jamzadeh discloses an electrostatic reproduction apparatus having a web tracking system wherein the web rotates about image processing stations with a plurality of rollers. A guide means is provided to move the web around the rollers. The guide means include a steering roller which is actuated according to a web tracking system.

The teachings of the above-referenced disclosures, however, have not relieved the need for a relatively low cost, simple and accurate registration system. That is, a system permitting superimposing successive images formed on a surface moving relative to the imaging stations by compensating for deviations in the travel of the belt from a predetermined aligned condition.

SUMMARY OF THE INVENTION

This invention provides a means and method to compensate for lateral registration errors in color digital printers adapted to form a composite color image. Specifically, the invention comprises a plurality of ROS image processing stations for forming composite images on a photosensitive belt surface movable relative to the image processing stations. Monitoring means are provided for determining a lateral deviation of the belt and to compute the lateral deviation of the surface at each of the image processing stations. The invention also includes means for compensating for the lateral deviations of the belt at each of the image processing stations.

More particularly, the present invention is used in a digital color printer which incorporates of a plurality of Raster Output Scanner (ROS) imagers in a single pass mode or incorporates a single ROS imager in a multiple pass mode. A split cell photodetector comprising two photosites with a common junction, is positioned at each ROS station at the beginning of the scan line formed by the imager and beneath the surface of the moving photoreceptor belt. A ROS scan beam is periodically swept across the surface of the belt in a fast scan (lateral) direction. A belt aperture formed in the surface of the belt in a non-image area, is periodically in alignment with this detector as the belt is moved in the process direction. Alternately stated, the belt hole moves across the scan line being laid down by the ROS imager. The ROS scan line is, therefore, viewed by the split cell detector through the aperture. The detector operation generates two separate electrical signals separated by a time delay, due to the space between the photodiode sites. An electrical circuit generates a signal when the two signals cross. Lateral movement of the belt from station to station creates signals of differing magnitude; the difference is used to generate correction signals to the individual ROS imager to adjust the first image pixel of the image scan line being formed.

Still more particularly, the present invention relates to a digital color printer for forming multiple color image exposure frames on a photoconductive member including:

a photoreceptor belt movable in a process direction accommodating the formation of multiple image exposure frames, said belt having at least one aperture formed outside of the exposure area, at least one Raster Output Scanner (ROS) imager which generates successive scan lines across the photoreceptor surface to produce said exposure frames in response to input video signals, split cell detecting means associated with each said ROS imager for detecting changes in the lateral position of said belt, said detecting means generating output signals when said ROS scan lines are visible through said aperture of said belt as said belt moves in the process direction, and means for generating signals for adjusting the lateral location of said exposure frames in relation to the detected lateral position of said aperture.

DESCRIPTION OF THE INVENTION

Figure 1:
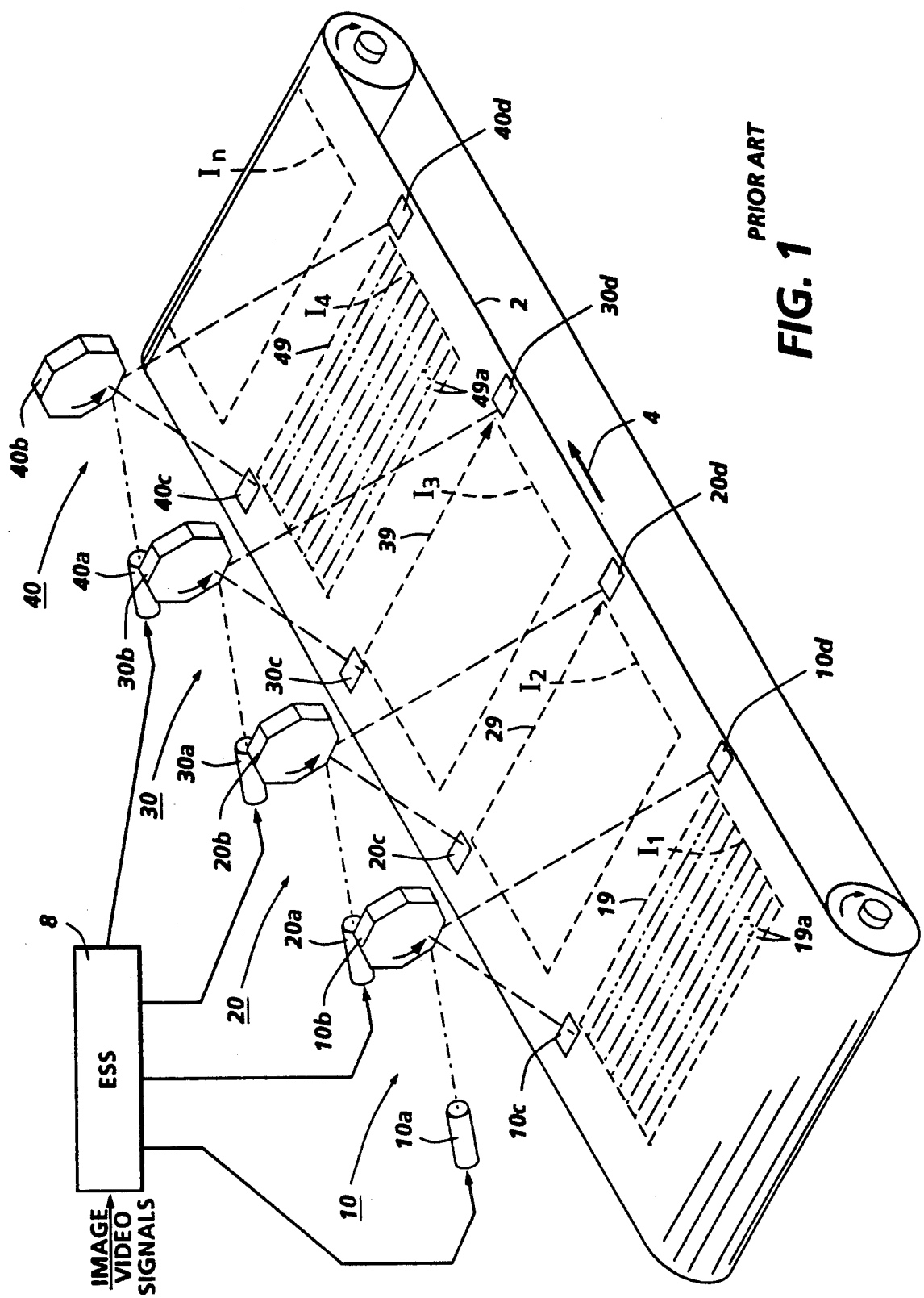
FIG. 1 shows a prior art color printer with a plurality of Raster Output Scanners (ROSs) used as the color imagers.

Referring initially to FIG. 1, before describing the invention in detail, there is shown a prior art, single pass, ROS multicolor printing system having four ROS systems, 10, 20, 30, and 40. The multicolor printing system includes a photoreceptor belt 2, driven in a process direction, indicated by the arrow 4. The length of the belt 2 is designed to accept an integral number of spaced image exposure frames, $I_1$-$I_N$, represented by dashed line rectangles. Each exposure frame has an associated charging station (not shown, but upstream from the imager) which places a predetermined electrical charge on the surface of belt 2. Each image area $I_1$-$I_N$ is exposed successively by ROS systems 10, 20, 30, 40, respectively. As each of the image exposure frames $I_1$-$I_4$ reaches a transverse line of scan, represented by lines 19, 29, 39, 49, the frame is progressively exposed on closely spaced transverse raster lines, shown generally with exaggerated longitudinal spacing as reference numerals 19a and 49a on the image areas $I_1$ and $I_4$, respectively.

Downstream from each exposure station, a development station (not shown) develops the latent image formed in the associated image area. A fully developed color image is then transferred to an output sheet at a transfer station (not shown). The charge, development, and transfer stations are conventional in the art. Details of charge and development xerographic stations in a multiple exposure single pass system are disclosed, for example, in U.S. Pat. Nos. 4,833,503; 4,611,901 and 4,791,452, the contents of which are hereby incorporated by reference.

Each ROS system 10, 20, 30, and 40 contains its own conventional scanning components, as variously described in the art. For purposes of simplicity, each ROS system 10, 20, 30, 40 is shown as having two components, namely, a laser light source 10a, 20a, 30a, 40a and a rotating polygon 10b, 20b, 30b, 40b, respectively. It will be appreciated by those of skill in the art that multiple scan lines may also be generated with a single ROS in a multiple pass system.

An exemplary ROS system 10, includes a gas, or preferably, diode laser light source 10a, having an output which is modulated by signals from control circuit 8, which output is optically processed to impinge on the facets of rotating polygon 10b. Each facet reflects the modulated incident laser beam as it is rotated to produce a scan line which is focused at the photoreceptor surface 2. Electronic Sub System (ESS) 8 contains the circuit and logic modules which respond to input video data signals and other control and timing signals to operate the photoreceptor drive in synchronism with the image exposure and to control the rotation of the polygon 10b by a motor (not shown). The other ROS systems 20, 30, 40, have their own associated laser diodes 20a, 30a, 40a, and polygons 20b, 30b, 40b, respectively.

As shown in FIG. 1, there are also two sets of scan line sensors associated with each ROS station. ROS station 10 has a start-of-scan (SOS) sensor 10c and an end of sensor (EOS) 10d, which are positioned above the surface of belt 2 at the ends of the path of the scanning beam. These sensors generate a pulse each time a scan line is swept across the photoreceptor surface, thereby establishing a start and end of scan for the image content for that particular line. Each ROS 20, 30, 40 has an associated detector pair.

Figure 2:
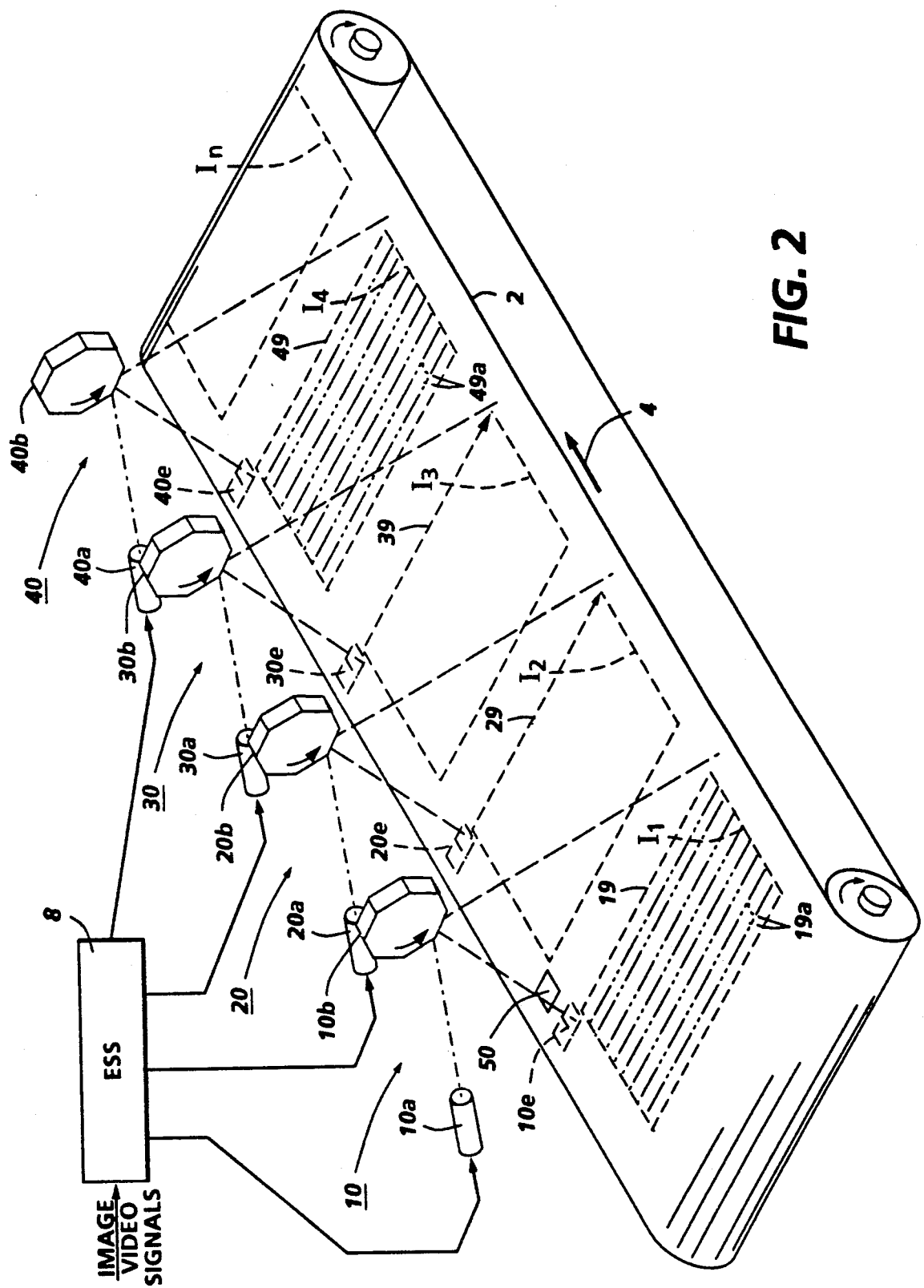
FIG. 2 shows the printer of FIG. 1 modified by adding an aperture through the belt and a split cell photodetector beneath the belt, opposite each ROS imager, according to the invention.

The ROS system must be color-registered so that each image $I_1$-$I_N$ is registered in both the fast scan (lateral) direction and in the process direction. Prior art solutions disclosed formation of holes in the belt outside the image area, location of photosensors beneath each image station and detection of light passage through the belt holes as it advances in the process direction. The light was provided, either from a dedicated light source as described in co-pending applications Ser. Nos. 07/635,835 and 07/859,746, filed on Mar. 30, 1992 or the light detected was from the ROS scanning beam, as disclosed, for example, in co-pending application Ser. No. 07/807,927. After correction signals are generated, various techniques are used to alter the characteristics or position of optical elements in the ROS optical system, for example, as described in co-pending applications Ser. No. 07/863,893, filed on Mar. 6, 1992; 07/821,526; 07/951,714, filed on Sep. 25, 1992. According to the present invention and as shown in FIG. 2, the system of FIG. 1 has been modified by adding belt hole 50 in a non-image area of the belt. Each ROS system, 10, 20, 30, 40, has a split cell photodetector 10e, 20e, 30e, 40e, respectively. The photodetectors are fixed in place beneath the surface of belt 2 and are aligned in the process direction so as to view the passage of hole 50, as the belt moves the hole therepast. The hole has a width in the lateral direction smaller than the width of the photodetector sites.

Figure 3:
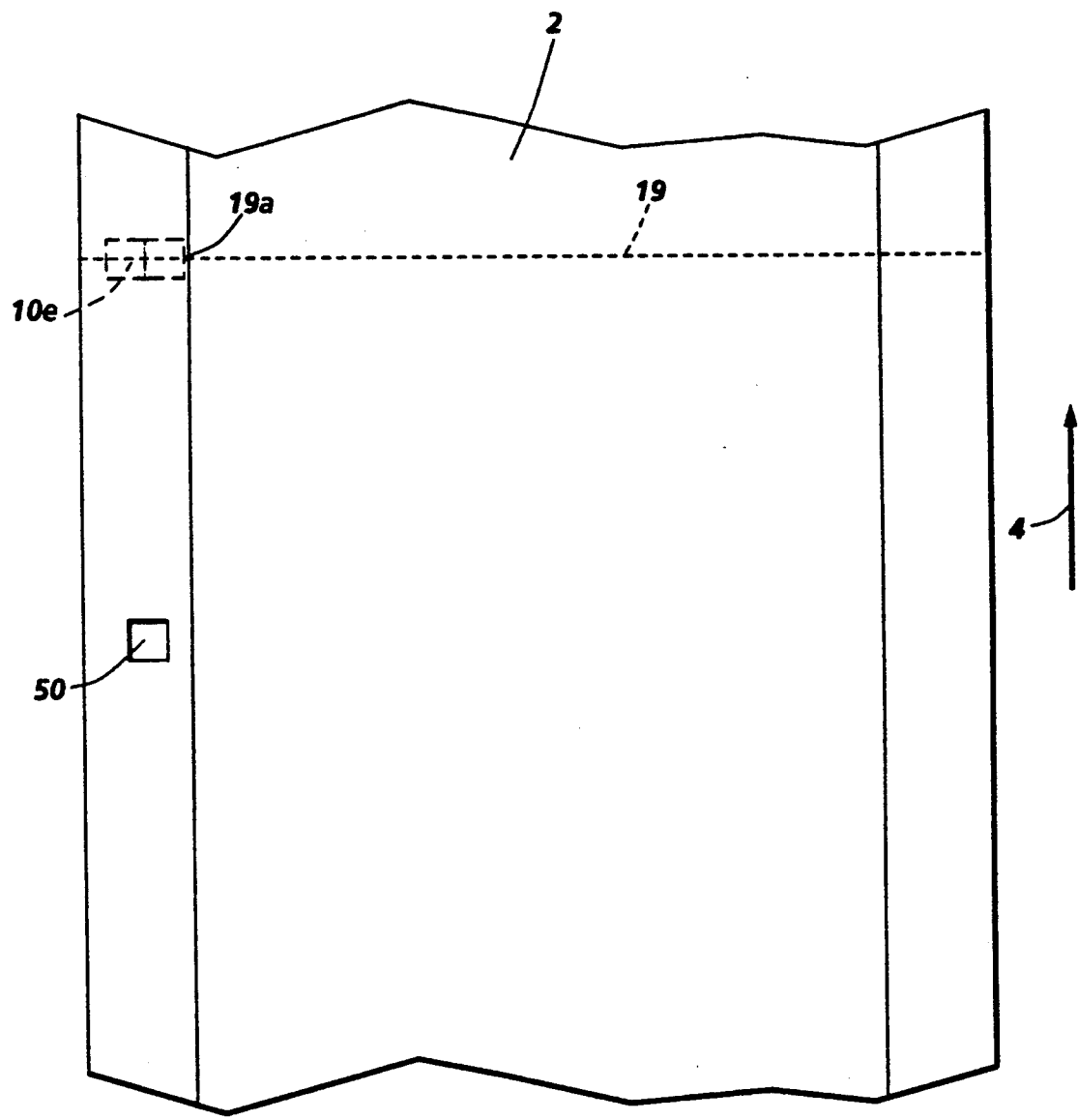
FIG. 3 shows a portion of the photoreceptor belt with an aperture therethrough advancing in a process direction towards a split cell photodetector.
Figure 4:
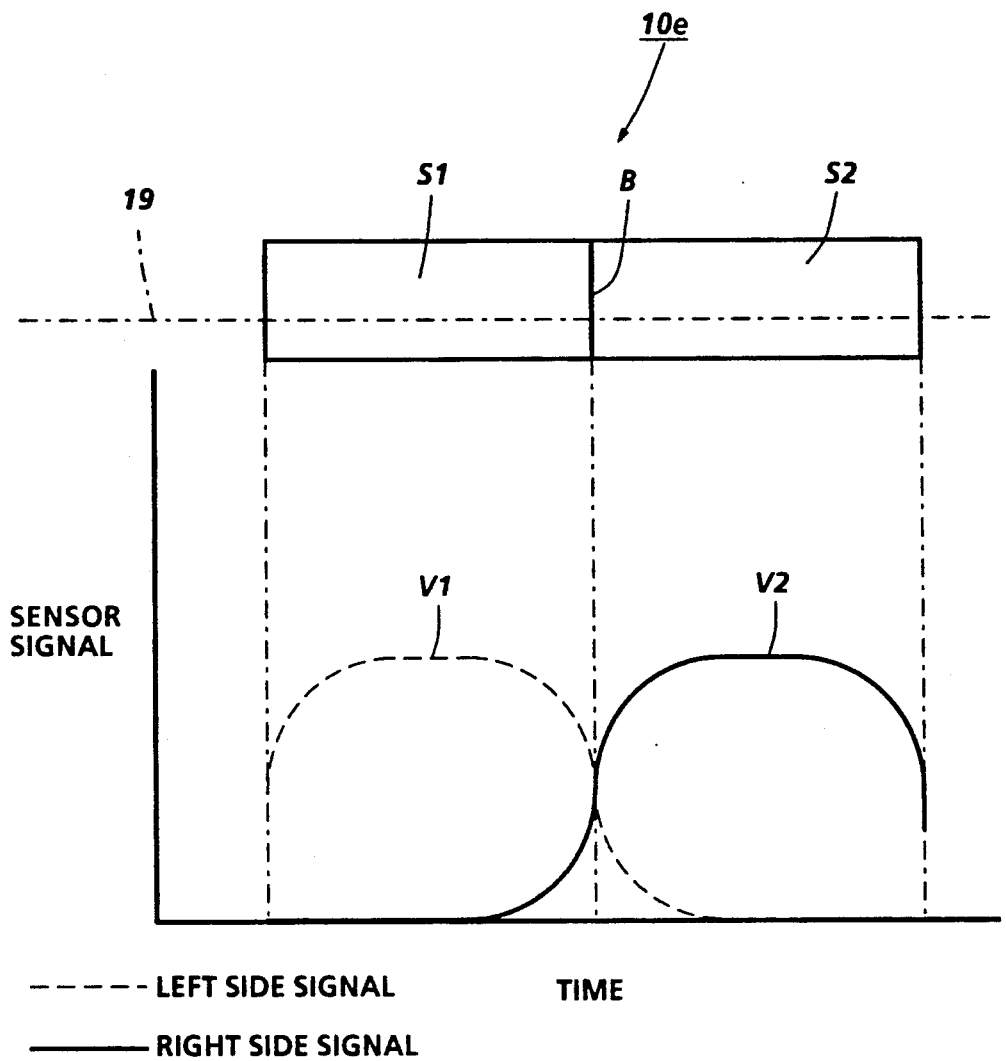
FIG. 4 shows the signal outputs from the photodetector shown in FIG. 2.

Referring still to FIG. 2, the SOS and EOS sensors have been omitted for purposes of clarity, but they would be located as shown in FIG. 1. FIG. 3 shows a top view of a portion of belt 2 with ROS beam 19 being swept across the surface of the belt. With each beam sweep, the beam is detected at the start of scan by SOS sensor 10c, generating a start of scan signal. The first image scan line 19 begins to write the image beginning with pixel 19a, after a previously set time delay. As the belt advances in the process direction (direction of arrow 4), belt hole 50 will cross the scan line and become visible at the split cell photodetector 10e. FIG. 4 shows photodetector 10e having two photosites S1, S2, separated by a small space, represented by a boundary line B. As beam 19 scans across sites S1, S2, two separate electrical signals V1, V2 are generated separately by a time delay due to the space B between the two sites. The time delay between the generation of the signal and the signals from the sensors 10c 10d are measured and the location of the center of the split cell photodetector, relative to the SOS and EOS sensors, is calculated and stored in system memory. With this arrangement, lateral movement of the belt can be determined with a high degree of accuracy and an appropriate correction signals can be generated to change the time delay signal so that the location of the first image data pixel (19a) can be adjusted to conform to the changed belt position, or alternatively, a belt steering mechanism can be enable to return the belt to a previous, properly registered position.

Figure 6:
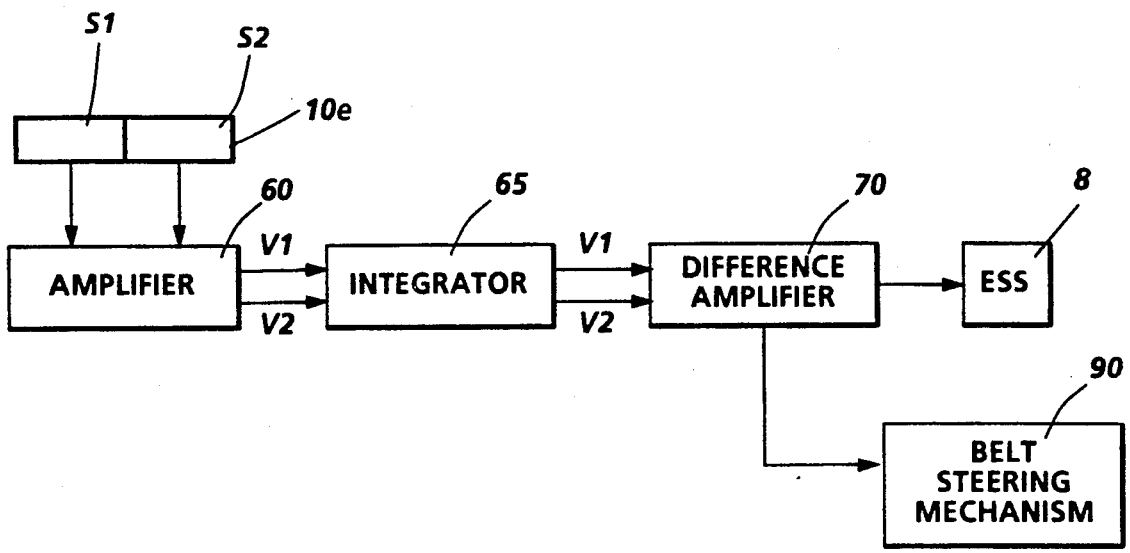
FIG. 6 shows circuitry for generating lateral correction signals from the photodetectors and use of the signals to correct for lateral misregistration.
Figure 5A:
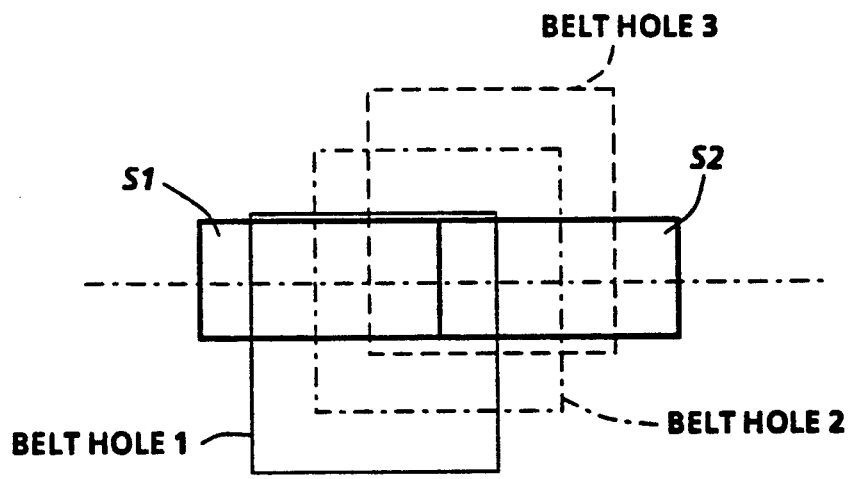
FIG. 5A shows several possible locations of the belt hole with respect to the photodetector.
Figure 5B:
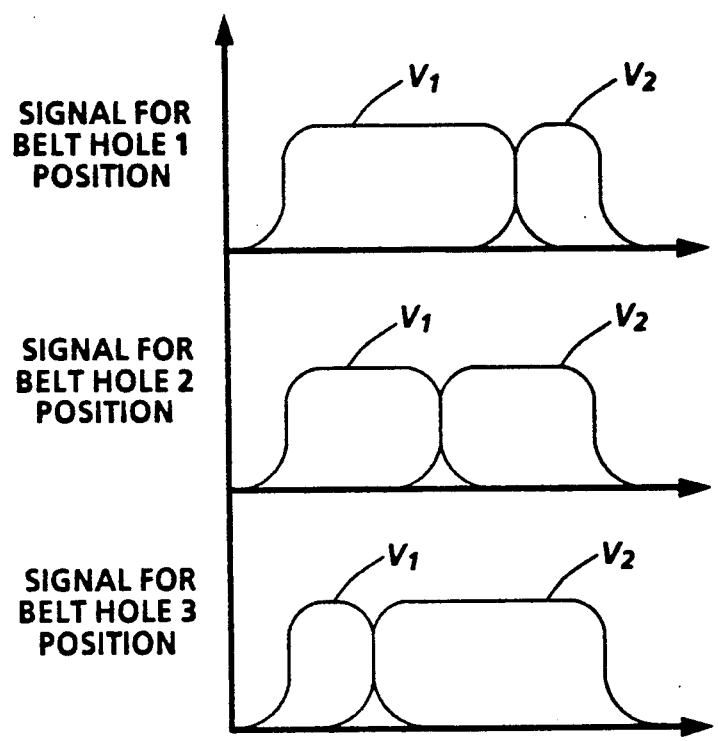
FIG. 5B shows the photodetector output signals for each belt hole location of FIG. 5A.

FIG. 5A shows three representative positions of the belt 50, relative to the photodetector 10e, to illustrate the concept of the invention. FIG. 5B illustrates the signals from the split cell photodetector corresponding to the different, lateral positions of the belt shown in FIG. 5A. For a first belt hole position (solid line in FIG. 5A), the belt has moved laterally to the left of an original position. Site S1 of photodetector 10e is receiving more light than site S2, so V1 is longer in duration than V2. The second belt hole position generates two equal segment signals, V1, V2, indicating the belt hole is centered on the detector. The third belt hole position indicates the belt has moved laterally to the right; site S2 is receiving light for a longer duration of time and, therefore, V2 is longer in duration than V1. With the comparative technique described below, appropriate signals can be generated to steer the belt until V1=V2 in time duration, e.g. in magnitude, or a signal can be sent to the SOS sensor to advance or delay the signal to begin printing of the image data. FIG. 6 shows circuitry to detect the lateral registration error and generate correction signals. The circuit is shown as operating for the output of split cell detector 10e, but outputs from the other split cell photodetectors would be operated on in a similar fashion. As shown, the signals coming from sites S1, S2 of the detector, are sent to an amplifier 60. The output signals V1, V2 will be proportional to the amount of time the beam was present on the photodetector sites. The two exposure values are integrated in integrator 65 and then compared in difference amplifier 70. The output signal will have a magnitude indicative of the sense and amount of deviation of the belt hole to the sensor. A correction signal is sent to either the ESS 8 to delay the beginning of the first pixel location of the image frame, or to a belt steering mechanism 90 to move the belt in an appropriate direction for correction. When V1 equals V2, no signal is generated.

While the invention has been described with reference to the structures disclosed, it is not confined to the details set forth, but is intended to cover such modifications or changes as they come within the scope of the following claims. For example, while the invention has been described in the context of a single pass system with a plurality of ROS imagers, the invention may also be practiced in a multiple pass system with a single ROS imager.

What is claimed is:

1. A digital color printer for forming multiple color image exposure frames on a photoconductive member including:

a photoreceptor belt movable in a process direction accommodating the formation of multiple image exposure frames, said belt having at least one aperture formed outside of the exposure area, at least one Raster Output Scanner (ROS) imager which generates successive scan lines across the photoreceptor surface to produce said exposure frames in response to input video signals, split cell detecting means associated with each said ROS imager for detecting changes in the lateral position of said belt, said detecting means generating output signals when said ROS scan lines are visible through said aperture of said belt as said belt moves in the process direction, said split cell detecting means having two separate photosites with a common boundary, said boundary being generally perpendicular to said scan lines, each site generating a separate output signal proportional to the time that light is incident on the cell, and means for amplifying said signals and for comparing said amplified signals, said comparing means generating an error signal for adjusting the lateral location of said exposure frame when the compared voltages are unequal in time duration.

2. The imaging system of claim 1 further including means for adjusting the lateral location of said exposure frames in response to said detecting means output signals.

3. The imaging system of claim 2 further including a belt steering mechanism for moving said belt in a lateral direction in response to said comparing means output signals, said movement continuing until each said signal is from said photosites is equal in magnitude.

4. The imaging system of claim 2 further including control means for changing a first image pixel location of the associated ROS until said output signals from said photosites are equal in magnitude.

5. A method of lateral registration of a plurality of image exposure frames sequentially formed on the surface of a photoreceptor belt moving in a process direction including the steps of:

directing multiple scan lines from a plurality of ROS imagers onto the surface of said photoreceptor to form said image exposure frames in response to video data inputs to said ROS imager, forming an aperture in the surface of the belt in a non-image area, said aperture periodically transmitting light from said ROS imagers therethrough, detecting the transmission of light through said aperture by a split cell photodetector having two separate photosites, generating output signals proportional to the light detected by each of said photosites having a common boundary generally perpendicular to said scan lines, comparing each of said photosite signals to each other, generating an output signal which is representative of a lateral registration error, and correcting said lateral registration error.

* * * * *